United States Patent
Melen

(10) Patent No.: US 6,426,806 B2
(45) Date of Patent: *Jul. 30, 2002

(54) ROUTING SCANNED DOCUMENTS WITH SCANNED CONTROL SHEETS

(75) Inventor: Roger D. Melen, Los Altos Hills, CA (US)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/052,873

(22) Filed: Mar. 31, 1998

(51) Int. Cl.$^7$ ................................................ H04N 1/32
(52) U.S. Cl. .................... 358/468; 358/402; 358/404; 358/407; 358/1.15
(58) Field of Search ................................ 358/407, 440, 358/400, 403, 404, 434, 444, 468, 1.1, 1.12, 1.13, 1.14, 1.15, 402; 379/100.09; 382/317; 399/84

(56) References Cited

U.S. PATENT DOCUMENTS

| | | | | |
|---|---|---|---|---|
| 5,099,340 A | * | 3/1992 | Kamada et al. | 358/403 |
| 5,247,591 A | * | 9/1993 | Baran | 382/61 |
| 5,287,199 A | * | 2/1994 | Zoccolillo | 358/402 |
| 5,513,013 A | * | 4/1996 | Kuo | 358/448 |
| 5,544,045 A |   | 8/1996 | Garland et al. | 364/419.03 |
| 5,600,835 A |   | 2/1997 | Garland et al. | 395/605 |
| 5,619,649 A | * | 4/1997 | Kovnnat et al. | 358/1.1 |
| 5,659,164 A | * | 8/1997 | Schmid et al. | 382/317 |
| 5,745,610 A | * | 4/1998 | Johnson | 382/309 |
| 5,859,935 A | * | 1/1999 | Johnson et al. | 382/317 |
| 5,875,038 A | * | 2/1999 | Gerber | 358/402 |
| 6,088,127 A | * | 7/2000 | Pieterse | 358/407 |

* cited by examiner

Primary Examiner—Mark Wallerson
(74) Attorney, Agent, or Firm—Fitzpatrick, Cella, Harper & Scinto

(57) ABSTRACT

A scanning system routes scanned document information (110) to a specified location (120) based on scanned control sheet information (108). Each location (120) is associated with an existing identifier (118). Scanned control sheet information (108) is retrieved by the scanning system from graphical information displayed on a control sheet (102). The system compares a tentative identifier (124) obtained from the scanned control sheet information (108) to existing identifiers (118) to determine a location (120) to which scanned document information (110) should be routed.

17 Claims, 3 Drawing Sheets

ROUTING SCANNED DOCUMENTS WITH SCANNED CONTROL SHEETS

FIELD OF INVENTION

This invention pertains to the field of routing scanned document information. More specifically, this invention pertains to the use of scanned control sheets to route scanned document information to an existing location.

BACKGROUND OF THE INVENTION

Scanners are commonly used in business enterprises and other organizations to convert paper documents into electronic form. Because scanners are expensive, complex pieces of equipment, it is common for many persons in an organization to share the use of a single scanner. Typically, the scanned document information generated when a user scans a document is stored in a default location. When the scanner is attached to a computer network, the scanned document information may ultimately be moved over the network to a desired location on the network, for instance a particular sub-directory of a user's file directory. In order to do this, however, the user needs to interact with a computer on the network after the document has been scanned.

Rather than putting scanned document information in a default storage area until claimed by someone on the network, a scanner may allow a user to enter a desired destination prior to scanning. Then the scanned document information can be routed directly to the desired destination, without further user intervention.

With either of these conventional systems, however, a user may not place a number of separate documents, each with a separate destination, into the scanner and expect the scanned document information to arrive at the correct locations without further intervention. When using a system of the first type, the user will need to later use a computer on the network to move the scanned document information to the appropriate locations. With the second type of system, the user will need to enter each separate destination into the scanner prior to the scanning of each document. Even though it may take a while for the scanner to work its way through each document, the user will typically need to wait for the scanner to finish scanning each document in order to enter the next destination.

What is needed is a scanning system which allows a user to communicate a desired destination for a scanned document in a way which allows the destination information to stay with the physical document. This would allow a set of documents, each with a unique destination, to be scanned and routed automatically, without further user intervention. This would also allow documents to be routed without the user having to interact with a computer.

SUMMARY OF THE INVENTION

The present invention is a system and method for directing the routing of scanned document information (110) with control sheets (102). A control sheet (102) is typically a piece of paper with graphical information on it. This information indicates to the system where the scanned document information (110) should be routed. It may be in the form of human-readable writing, it may be in the form of machine-readable markings, or it may be a combination of the two. The system retrieves this information by scanning the control sheet (102). In one embodiment, the invention routes the scanned document information (110) to the destination (120) which most nearly matches the scanned control sheet information (108). This allows for proper operation in the case of minor errors in the analysis of the control sheet information (108).

DETAILED DESCRIPTION OF THE PREFERRED EMBODIMENTS

Figure 1:
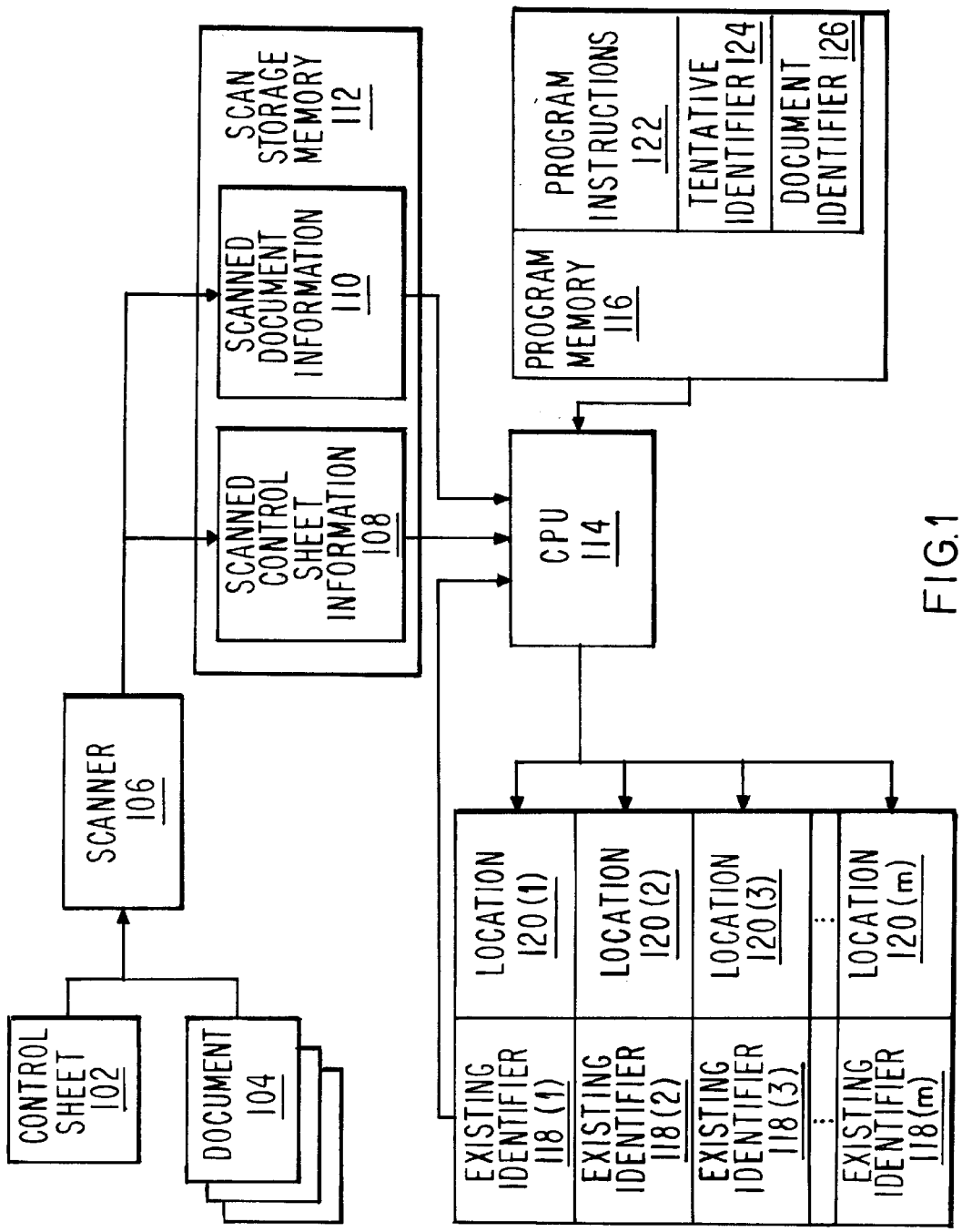
FIG. 1 is an illustration of one embodiment of the present invention.

Referring now to FIG. 1, the operation of one embodiment of the present invention is shown to include scanner 106. Document 104 to be scanned and routed to a particular one of several locations 120 is fed into scanner 106 with control sheet 102. Control sheet 102 of the described embodiment is a piece of paper. In alternate embodiments control sheet 102 may be any object which can be scanned by scanner 106, including transparencies, cardboard, etc. Control sheet 102 displays information in a graphical form which may be detected by scanner 106. In the described embodiment, this information takes the form of human-readable text. In an alternate embodiment, this information may be in a form other than a human-readable form, such as conventional bar codes. Control sheet 102 may be fed into scanner 106 either immediately prior or immediately following document 104 being fed into scanner 106. Scanner 106 can include modes, selectable by the user, which indicate whether control sheet 102 precedes or follows document 104. Alternately, information contained in control sheet 102 can indicate whether it is associated with the preceding or following document 104.

Figure 2:
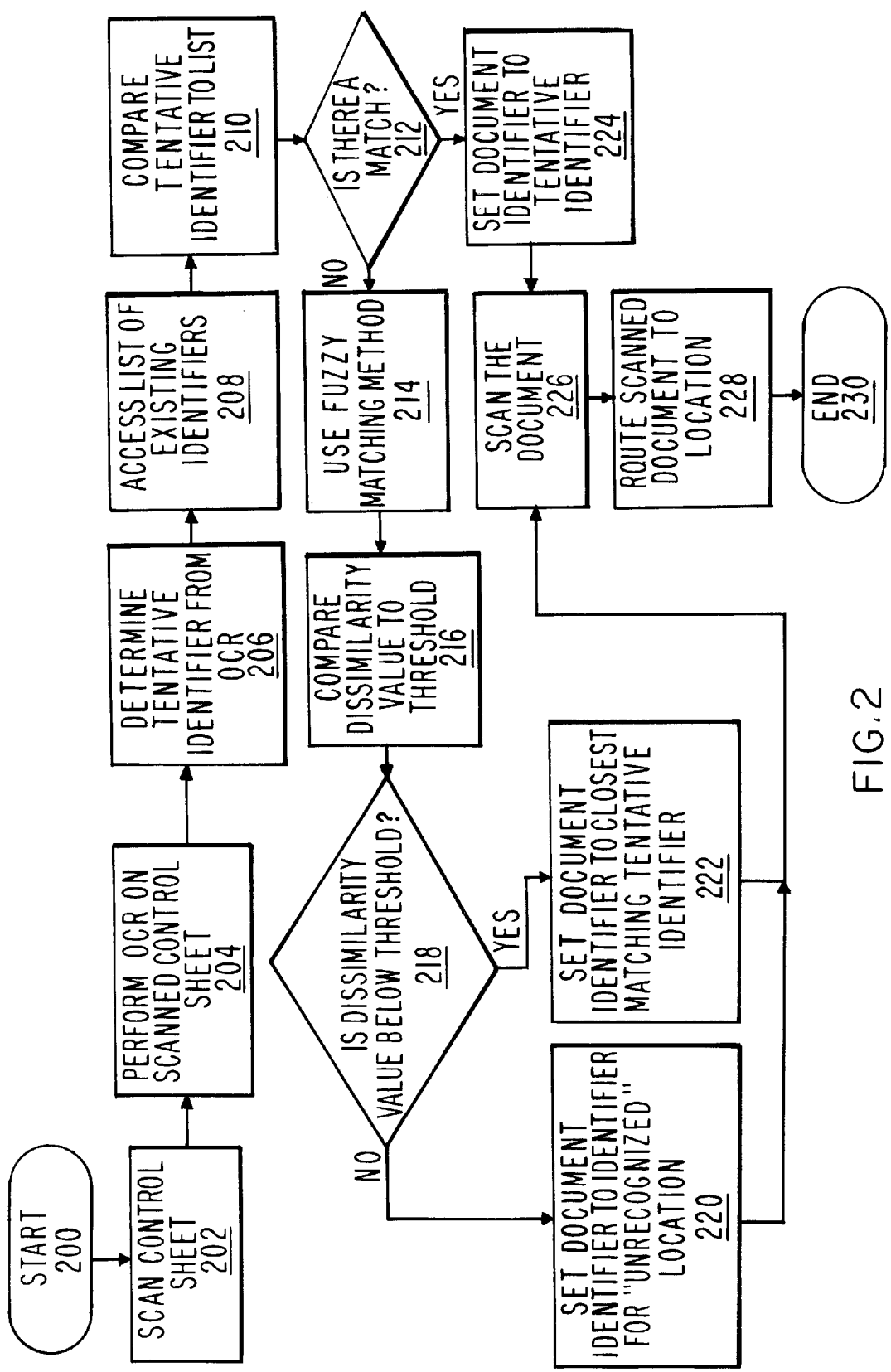
FIG. 2 is a flowchart illustrating the operation of one embodiment of the present invention.

FIG. 2 is a flowchart of a method for practicing the invention. The modules which make up the steps of the flowchart can be implemented in hardware, firmware, software or any combination thereof. Referring now to FIGS. 1 and 2, when scanner 106 scans 202 control sheet 102, scanned control sheet information 108 is produced. Scanned control sheet information 108 is an electronic image of the graphical information displayed by control sheet 102, and is stored in scan storage memory 112. Scan storage memory 112 is a digital memory device which is capable of being written to and read from. Central processing unit (CPU) 114, which can reside either within scanner 106 or outside scanner 106, reads scanned control sheet information 108 out of scan storage memory 112 and interprets it using Optical Character Recognition (OCR) 206. OCR is a conventional process by which human-readable graphical characters are converted into machine-readable digital information. These human-readable characters may be either handwritten or machine produced. Alternatively, CPU 114 may use other methods of image analysis to determine machine-readable digital information from scanned control sheet information 108. Other forms of machine-readable information include bar-codes and dot-patterns. Such machine-readable information can include checksum information to increase the accuracy of the scanned control sheet information 108.

The information extracted from scanned control sheet information 108 in step 206 is tentative identifier 124. Tentative identifier 124 is used to determine the appropriate document identifier 126 for information from document 104.

Document identifier 126 is an identifier which is associated with a scanned document and with the location 120 to which the scanned document information 110 is to be routed. CPU 114 accesses 208 a list of existing identifiers 118, each of which is associated with a particular location 120. There are an arbitrary number, m, of existing identifiers 118 and locations 120. In alternate embodiments of the present invention the number of existing identifiers 118 and the number of locations 120 may be different. For example, an existing identifier 118 could be associated with more than one location 120, and a location 120 could be associated with more than one existing identifier 118.

Each location 120 can comprise one or more of the following: a computer file folder, a computer file directory, and an entry in a database linking the location to information necessary to retrieve the scanned document information.

After accessing 208 the list of existing identifiers 118, CPU 114 compares 210 tentative identifier 124 to the list of existing identifiers 118, to determine 212 whether any existing identifier 118 matches tentative identifier 124. If an existing identifier 118 does match tentative identifier 124, document identifier 126 is set to that tentative identifier 224. Otherwise, a fuzzy matching method is used 214 to determine whether any existing identifier 118 is similar enough to tentative identifier 124 to be considered a match. Fuzzy matching encompasses all non-literal matching methods.

Figure 3:
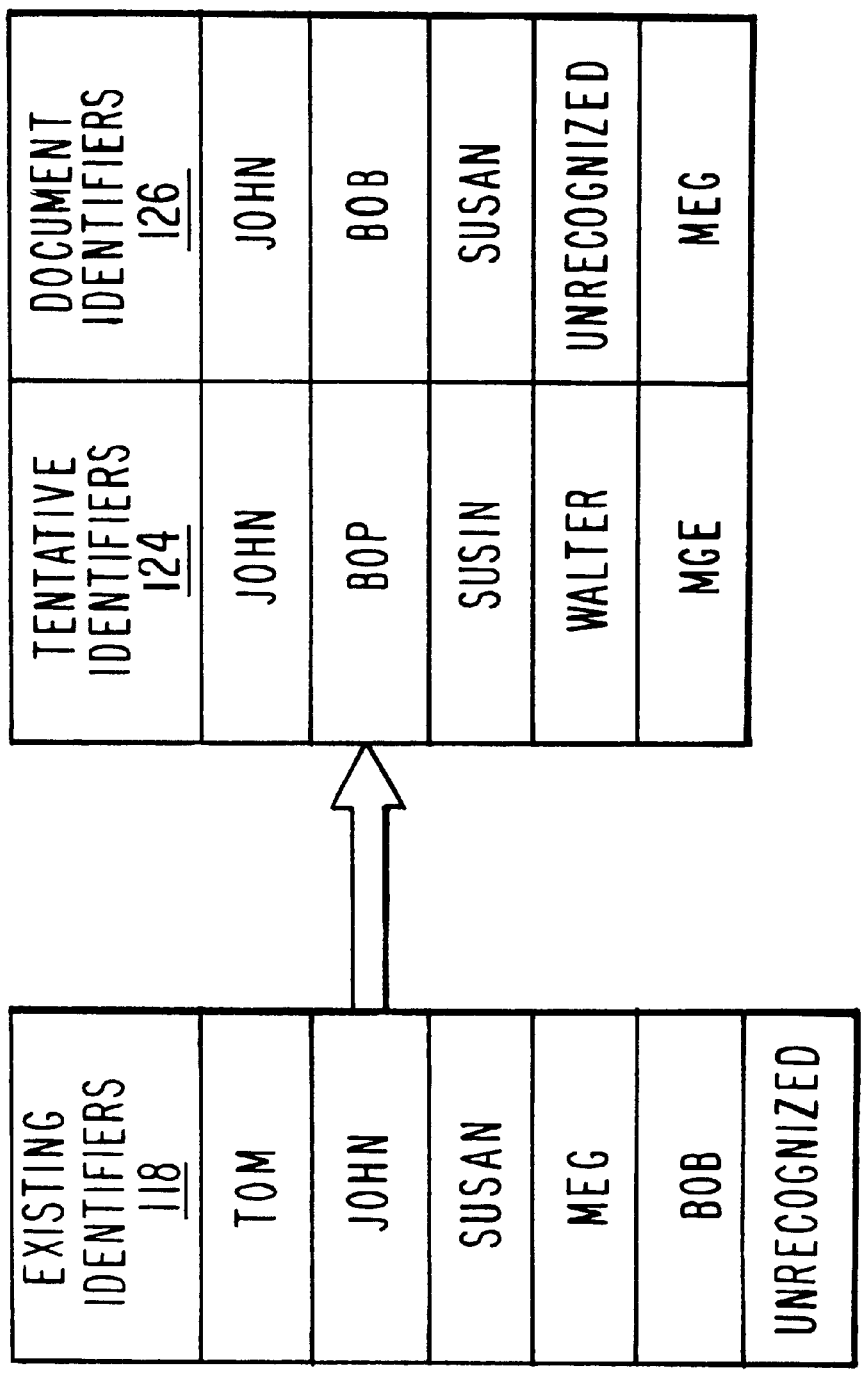
FIG. 3 is a diagram illustrating the use of existing identifiers 118 and tentative identifiers 124 to determine document identifiers 126.

An example of a fuzzy matching method which can be used is that described in U.S. Pat. No. 5,600,835 to Harry T. Garland et al., which is incorporated by reference herein in its entirety. This fuzzy matching method compares two character strings and generates a "dissimilarity value," which is a measure of how different the character strings are. In step 214, a dissimilarity value is computed for each existing identifier 118, as compared to the tentative identifier 124. CPU 114 then compares 216 each generated dissimilarity value to a predetermined threshold, in order to determine whether any dissimilarity value is lesser than the threshold 218. If no dissimilarity value is lesser than the threshold, document identifier 126 is set 220 to an identifier associated with a location for documents with unrecognized tentative identifiers. If there is an existing identifier 118 for which the dissimilarity value is lesser than the threshold, the document identifier 126 is set 222 to equal the existing identifier 118 with the smallest dissimilarity value. As illustrated in FIG. 3, tentative identifiers 124 which exactly or nearly match one of the existing identifiers 118 cause the document identifier 126 to be set to that existing identifier 118. Those tentative identifiers 124 which do not nearly match an existing identifier 118 (such as "Walter" in FIG. 3) result in a document identifier 126 which is used for unrecognized tentative identifiers 124 ("Unrecognized," in FIG. 3). All unrecognized document information 110 is routed to a location 120 for such "lost" document information 110. In the illustrative embodiment, the threshold value is either a default value, or is set by the user of the system through a user interface. There are other methods known and available to those skilled in the art for performing fuzzy matching. Thus, any method for fuzzy matching may be incorporated into the inventive system.

After the document identifier 126 has been set in any of steps 220, 222, or 224, the document 104 is scanned 226 into scanner 106, resulting in scanned document information 110. As described earlier, this step 226 could instead take place prior to the scanning 202 of control sheet 102. Scanned document information 110 is stored in scan storage memory 112. In an alternate embodiment, scanned control sheet information 108 and scanned document information 110 are stored in separate scan storage memories 112. CPU 114 then transfers 228 scanned document information 110 to the location 120 associated with document identifier 126. There are many known methods for routing document information 110 to an identified location 120.

The use of the present invention allows for scanned document information 110 to be centrally directed. For example, a worker may receive a work order for a particular job. This work order, while communicating to the worker what is to be done, might also include machine-readable identification, and be a control sheet 102. After completing the job, which includes producing or retrieving documents which need to be scanned, the worker puts the documents 104 and the control sheet 102 into a scanning system which operates in accordance with the present invention. Because the control sheet 102 is specific to the job, it can route scanned document information 110 to a location 120 which is also job-specific. Such a system would be useful to persons such as insurance adjusters, who need to retrieve, scan, and store case-specific documents 104 which might already exist in paper form.

Because scanning is non-destructive, this invention also allows users to keep a few control sheets 102 for repeated use. One control sheet 102 could be for personal documents, while others might be client specific. Any time a document 104 in one of these categories is to be scanned, the appropriate control sheet 102 would be included, to ensure the scanned document information 110 is routed to the proper location 120.

The above description is included to illustrate the operation of an exemplary embodiment and is not meant to limit the scope of the invention. The scope of the invention is to be limited only by the following claims. From the above description, many variations will be apparent to one skilled in the art that would yet be encompassed by the spirit and scope of the present invention.

What is claimed is:

1. A document routing device for routing scanned document information to at least one of a plurality of locations based on graphical content of a control sheet, which locations are each associated with at least one of a plurality of existing identifiers, and which control sheet displays information in a graphical form, the device comprising:

a scan storage memory coupled to a scanner for storing scanned control sheet information and scanned document information;

a central processing unit (CPU) coupled to the scan storage memory;

a program memory, coupled to the CPU, and storing a set of instructions, which, when executed by the CPU, cause the CPU to:

access control sheet information from the scan storage memory;

determine a tentative identifier from the control sheet information;

compare the tentative identifier to the existing identifiers;

access scanned document information from the scan storage; and responsive to the tentative identifier matching one of the existing identifiers, route the scanned document information to a location associated with that existing identifier.

2. The device of claim 1, wherein each location associated with an existing identifier is at least one of a computer file folder, a computer file directory, and an entry in a database linking the location to information necessary to retrieve the scanned document information.

3. The device of claim 1, wherein the step of determining a tentative identifier from the control sheet information comprises the sub-steps of:
   performing Optical Character Recognition (OCR) on the control sheet information; and
   determining a tentative identifier from the results of the OCR.

4. The device of claim 1, wherein the array of instructions, when executed by the CPU, cause the CPU to:
   responsive to the tentative identifier not matching any of the existing identifiers, and responsive to an existing identifier exhibiting the desired level of similarity to the tentative identifier, route the scanned document information to a location associated with an existing identifier which exhibits the desired level of similarity to the tentative identifier.

5. The device of claim 4, wherein routing the scanned document information to a location associated with an existing identifier which exhibits the desired level of similarity to the tentative identifier comprises the step of:
   routing the scanned document information to a location associated with the existing identifier which is most similar to the tentative identifier.

6. The device of claim 4, wherein the array of instructions, when executed by the CPU, cause the CPU to:
   responsive to a determination that no existing identifier exhibits the desired level of similarity to the tentative identifier, route the scanned document information to a location for scanned document information with unrecognized tentative identifiers.

7. The device of claim 4, wherein determining whether there is an existing identifier which exhibits the desired level of similarity to the tentative identifier comprises the steps of:
   using a matching method to determine for each of the existing identifiers a dissimilarity metric which is a measurement of the dissimilarity between the tentative identifier and that existing identifier; and
   comparing the dissimilarity metric which indicates the least dissimilarity to a dissimilarity threshold to determine whether the existing identifier associated with that dissimilarity metric exhibits the desired level of similarity to the tentative identifier.

8. The device of claim 7, wherein the array of instructions, when executed by the CPU, cause the CPU to:
   responsive to a determination that no existing identifier exhibits the desired level of similarity to the tentative identifier, route the scanned document information to a location for scanned document information with unrecognized tentative identifiers.

9. A document routing device located at a first location for routing scanned document information from the first location to at least one of a plurality of remote locations physically distanced from the first location based on graphical content of a control sheet, which remote locations are each associated with at least one of a plurality of existing identifiers, the device comprising:
   a scanner for scanning the control sheet and a document to thereby generate scanned control sheet information and scanned document information;
   a scan storage memory coupled to the scanner for storing the scanned control sheet information and the scanned document information;
   a central processing unit (CPU) coupled to the scan storage memory; and
   a program memory, coupled to the CPU, and storing a set of instructions, which, when executed by the CPU, cause the CPU to:
      access control sheet information from the scan storage memory;
      determine a tentative identifier from the control sheet information;
      compare the tentative identifier to the existing identifiers;
      access scanned document information from the scan storage memory; and
      responsive to the tentative identifier matching an existing identifier, route the scanned document information from the first location to a remote location associated with the matching existing identifier.

10. A method for routing scanned document information to at least one of a plurality of locations based on graphical content of a control sheet, which locations are each associated with at least one of a plurality of existing identifiers, the method comprising the steps of:
    selecting which of the control sheet and a document which is not the control sheet is to be scanned first;
    scanning the control sheet and the document which is not the control sheet to retrieve scanned control sheet information and scanned document information respectively, the step of scanning being responsive to the step of selecting and the scanning order being dictated by the selection made in the step of selecting;
    determining a tentative identifier from the control sheet information;
    comparing the tentative identifier to the existing identifiers; and
    responsive to the tentative identifier matching an existing identifier, routing the scanned document information to a location associated with the matching existing identifier.

11. A method for routing scanned document information of plural documents to plural locations based on graphical content of a single control sheet, which locations are associated with plural existing identifiers, the method comprising the steps of:
    selecting whether to scan the single control sheet before the plural documents, or to scan the plural documents before the single control sheet;
    responsive to said selecting step, scanning the single control sheet before the plural documents, or scanning the plural documents before the single control sheet, in accordance with the selection;
    wherein the single control sheet is scanned to retrieve scanned control sheet information therefrom, and wherein the plural documents are scanned to retrieve scanned document information therefrom;
    determining plural tentative identifiers from the control sheet information, the plural tentative identifiers being associated with respective ones of plural documents;
    comparing tentative identifiers to existing identifiers; and
    responsive to tentative identifiers, routing the scanned document information to locations associated with matching existing identifiers.

12. The method of claim 11, wherein said selecting step selects scanning of the plural documents before scanning of the single control sheet.

13. The method of claim 11, wherein said selecting step selects scanning of the single control sheet before scanning of the plural documents.

14. A document routing device for routing scanned document information of plural documents to plural locations based on graphical content of a single control sheet, which locations are associated with plural existing identifiers, the device comprising:
- a scanner for scanning a single control sheet and plural documents to thereby generate scanned control sheet information and scanned document information;
- a scan storage memory coupled to the scanner for storing scanned control sheet information from the single control sheet and for storing scanned document information from the plural documents;
- a central processing unit (CPU) coupled to the scan storage memory; and
- a program memory, coupled to the CPU, and storing a set of instructions, which, when executed by the CPU, cause the CPU to:
  - access control sheet information from the scan storage memory;
  - determine plural tentative identifiers from the control sheet information;
  - compare the tentative identifiers to the existing identifiers;
  - access scanned document information from the scan storage; and
  - responsive to the tentative identifiers matching existing identifiers, route the scanned document information to the locations associated with the matching existing identifiers.

15. The document routing device of claim 14 wherein the program memory further stores instructions which, when executed by the CPU, are responsive to user selection of which of the (a) single control sheet and (b) plural documents is scanned and stored first and which, when executed by the CPU, dictates the scanning order in accordance with the user selection.

16. A method for routing scanned document information to at least one of a plurality of locations based on graphical content of a control sheet, which locations are each associated with at least one of a plurality of existing identifiers, the method comprising the steps of:
- scanning the control sheet to retrieve scanned control sheet information therefrom, the scanned control sheet information including a tentative identifier and check-sum information;
- determining a tentative identifier from the control sheet information;
- using the check-sum information to verify the accuracy of the determined tentative identifier;
- comparing the verified tentative identifier to the existing identifiers;
- scanning a document which is not a control sheet, to retrieve scanned document information therefrom; and
- responsive to the verified tentative identifier matching an existing identifier, routing the scanned document information to a location associated with the matching existing identifier.

17. A document routing device for routing scanned document information to at least one of a plurality of locations based on graphical content of a control sheet, which locations are each associated with at least one of a plurality of existing identifiers, the device comprising:
- a scan storage memory coupled to a scanner for storing scanned document information and scanned control sheet information which includes a tentative identifier and check-sum information;
- a central processing unit (CPU) coupled to the scan storage memory; and
- a program memory coupled to the CPU and storing a set of instructions which, when executed, cause the CPU to:
  - access control sheet information from the scan storage memory;
  - determine a tentative identifier from the control sheet information;
  - use the check-sum information to verify the accuracy of the determined tentative identifier;
  - compare the verified tentative identifier to the existing identifiers;
  - access scanned document information from the scan storage memory; and
  - responsive to the verified tentative identifier matching one of the existing identifiers, route the scanned document information to a location associated with the matching existing identifier.

* * * * *

UNITED STATES PATENT AND TRADEMARK OFFICE
CERTIFICATE OF CORRECTION

PATENT NO. : 6,426,806 B2
DATED : July 30, 2002
INVENTOR(S) : Roger D. Melen

It is certified that error appears in the above-identified patent and that said Letters Patent is hereby corrected as shown below:

Column 2,
Line 64, "is" should read -- is a --.

Column 4,
Line 60, "storage;" should read -- storage memory; --; and
Line 61, "responsive" should read -- respond --.

Column 5,
Lines 12, 28 and 47, "responsive" should read -- respond --.

Column 6,
Line 12, "responsive" should read -- respond --.
Lines 34, 46 and 59, "responsive" should read -- responding --.

Column 7,
Line 25, "storage;" should read -- storage memory; --; and
Line 26, "responsive" should read -- respond --.

Column 8,
Lines 11 and 39, "responsive" should read -- responding --.

Signed and Sealed this

Eighteenth Day of February, 2003

JAMES E. ROGAN
*Director of the United States Patent and Trademark Office*